(12) United States Patent
Gerner et al.

(10) Patent No.: US 6,901,263 B2
(45) Date of Patent: May 31, 2005

(54) DEVICE FOR REMOTE LOCATION OF AN OBJECT AND METHOD FOR OPERATING THE DEVICE

(75) Inventors: Henrik Gerner, Larvik (NO); Tor Engebretsen, Larvik (NO)

(73) Assignee: Electric Target System AS, Larvik (NO)

( * ) Notice: Subject to any disclaimer, the term of this patent is extended or adjusted under 35 U.S.C. 154(b) by 367 days.

(21) Appl. No.: 10/148,648

(22) PCT Filed: Dec. 1, 2000

(86) PCT No.: PCT/NO00/00408

§ 371 (c)(1),
(2), (4) Date: Sep. 30, 2002

(87) PCT Pub. No.: WO01/40822

PCT Pub. Date: Jun. 7, 2001

(65) Prior Publication Data

US 2003/0104821 A1 Jun. 5, 2003

(30) Foreign Application Priority Data

Dec. 1, 1999 (NO) .............................. 995896

(51) Int. Cl.$^7$ ................................ H04Q 7/20
(52) U.S. Cl. .................. 455/456.1; 455/414.1; 455/574; 342/450; 342/457
(58) Field of Search .............. 455/456.1–6, 457, 455/67.11, 414.1, 574, 127.1, 127.5, 344, 556.1, 557; 342/450, 457

(56) References Cited

U.S. PATENT DOCUMENTS

| 4,891,650 | A | * | 1/1990 | Sheffer ........................ 342/457 |
|---|---|---|---|---|
| 5,432,841 | A | * | 7/1995 | Rimer ......................... 455/457 |
| 5,515,043 | A | | 5/1996 | Berard et al. |
| 5,666,647 | A | * | 9/1997 | Maine ......................... 455/12.1 |
| 5,666,662 | A | | 9/1997 | Shibuya |
| 5,727,057 | A | * | 3/1998 | Emery et al. ........... 379/201.07 |
| 5,742,233 | A | | 4/1998 | Hoffman et al. |
| 5,895,436 | A | | 4/1999 | Savoie et al. |
| 5,930,717 | A | | 7/1999 | Yost et al. |
| 5,953,677 | A | | 9/1999 | Sato |
| 6,108,524 | A | * | 8/2000 | Hershey et al. .......... 455/67.11 |
| 6,212,393 | B1 | * | 4/2001 | Suarez et al. ............ 455/456.4 |
| 6,321,091 | B1 | * | 11/2001 | Holland .................... 455/414.2 |
| 6,522,265 | B1 | * | 2/2003 | Hillman et al. ............. 340/988 |

FOREIGN PATENT DOCUMENTS

| EP | 0 812 119 A2 | 12/1997 |
|---|---|---|
| WO | WO98/34126 | 8/1998 |

* cited by examiner

*Primary Examiner*—CongVan Tran
(74) *Attorney, Agent, or Firm*—Merchant & Gould P.C.

(57) ABSTRACT

The invention relates to a locating device for remote location of an object, and a method for operating the locating device, particularly with a view to recovering objects which are stolen. The locating device comprises a mobile communication unit which is placed together with the object. Data concerning the communication unit's position are determined and registered by means of the existing infrastructure in a cellular network of which the communication unit forms a part when it is activated. The communication unit can be activated to a standby mode and deactivated to a sleep mode. The invention is characterized in that the communication unit is activated and deactivated depending on a time-variable signal generated in the locating device, thus providing a reduction in the communication unit's average power consumption. The signal is preferably derived from the locating device's acceleration.

8 Claims, 3 Drawing Sheets

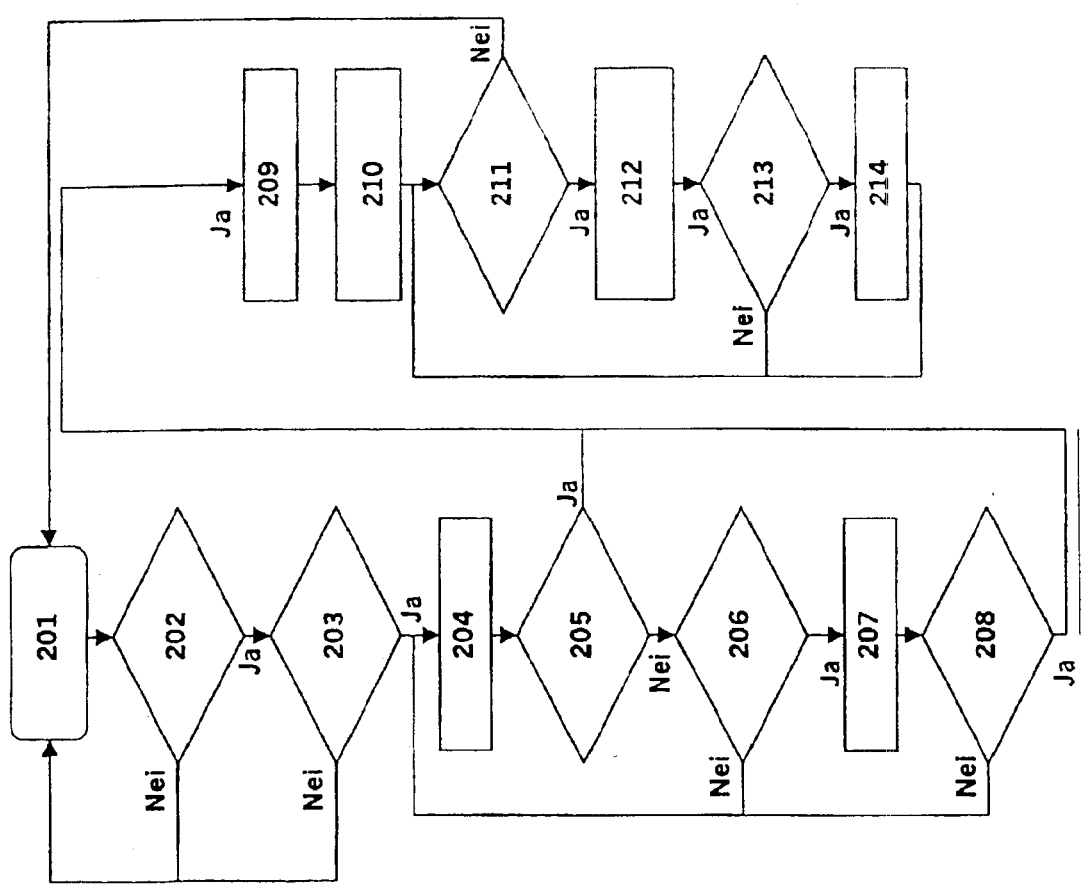

DEVICE FOR REMOTE LOCATION OF AN OBJECT AND METHOD FOR OPERATING THE DEVICE

Figure 1:
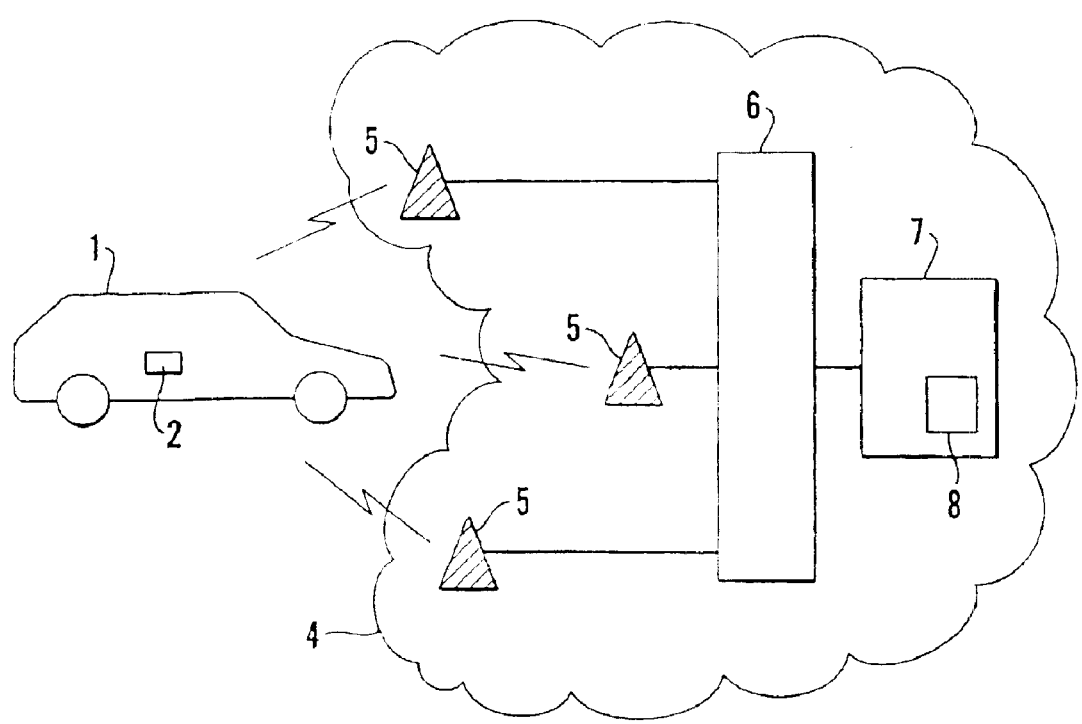

The invention relates to a method as indicated in the introductory part of the following claim 1 and a device as indicated in the introductory part of the following claim 7.

A large number of methods are known in the prior art for remote location of objects. In this context "remote location of an object" should be understood to mean providing information on the object's geographical position to a place remotely located from the object. Some examples of areas of application for such methods include recovery of vehicles or other objects which have been stolen, and tracing of missing persons or animals.

Such methods usually involve placing a locating device together with the object. Locating the device thereby entails locating the object.

Many of the known methods employ modern telecommunication technology. A number of solutions are known, for example, where the position of an object which has to be located is known by means of a locating device based on GPS technology (Global Positioning System), placed together with the object. The locating device may further comprise a radio transmitter which when required transmits data concerning the device's geographical position to a centrally located receiver.

An example of such a solution is disclosed in U.S. Pat. No. 5,742,233. The publication describes a system for locating a person, where the person is equipped with a locating device comprising a GPS receiver and a radio transmitter.

Another example is described in U.S. Pat. No. 5,515,043, which discloses a method for locating vehicles. In the method, a mobile telephone, a GPS receiver and a control unit are placed in the vehicle. Amongst other things, the method enables the mobile telephone to be called up, whereupon information is provided concerning the vehicle's position via the mobile telephone network.

In the above-mentioned publications a GPS receiver is used to provide position data. A receiver of this kind is a complicating factor which results in increased costs and should be avoided if possible.

Developments which have taken place in recent years in the field of mobile telephony, particularly cellular, digital systems such as the GSM system (Global System for Mobile Communications), have opened the way for new possibilities for remote location of objects. The infrastructure and available services in the GSM network enable data to be provided for the geographical position of an activated GSM telephone with some degree of geographical precision and time resolution. The geographical precision has previously been limited on account of the extent of the cells of which the GSM network is composed, which has reduced the ability to employ the said data for remote location.

In recent times new services have been developed which permit a more precise location of GSM telephones. U.S. Pat. No. 5,930,717 describes an example of a method for improving such location. In a press release from Ericsson, dated 5. Nov. 1998, a mobile positioning system designated MPS (Mobile Positioning System) is described, which is claimed to be capable of locating ordinary GSM telephones with an accuracy of 125 metres, and a system for user applications' access to GSM telephones' position, designated MLC (Mobile Location Centre). The technological development in this field indicates that suppliers of mobile telephone services in the future will be able to offer progressively better services for precise location of mobile telephones.

A method and a system for locating and tracing vehicles, where the existing infrastructure in a cellular mobile telephone network is employed for determining the vehicle's geographical position is described in U.S. Pat. No. 5,895,436. Here the mobile telephone is installed in a vehicle. The mobile telephone normally operates in a continuous standby mode, where it is ready to receive. If the vehicle has to be located, the mobile telephone is called up, thereby bringing it into an active mode, and its cellular position is identified. A more precise location is then performed by means of radio direction finding techniques.

For applications where remote location is required of objects which have been stolen, such as vehicles, boats, personal computers, stereo equipment and similar easily sold capital goods, a special problem arises: when a locating device has been placed together with the object, the locating device may be detected by unauthorised persons and then removed or rendered inoperative. Two requirements which ought to be met by a locating device for this kind of application are firstly that it should be self-sufficient with regard to energy over a long period of time, thus preventing it from being rendered inoperative by a simple disconnection of wires, and secondly it should be concealed so that it is difficult for unauthorised persons to detect.

A first disadvantage of the system known from U.S. Pat. No. 5,895,436 is that during normal operation the mobile telephone is activated in a continuous standby mode, where it consumes electrical energy. This may be acceptable for fixed installations in a vehicle, where there is a relatively large energy supply available. Nevertheless, it is clearly a drawback in other situations where there are limited electrical energy resources available.

A second disadvantage of this known system is that since the mobile telephone is continuously activated in a standby mode, it transmits at regular intervals a response to questions from the network. This regular transmission means that it is relatively easy to trace, for example by a person who has been in illegal possession of the object. It may be envisaged that the person then removes the mobile telephone from the object, thereby preventing the possibility of remote location of the mobile telephone leading to location of the object. It is also possible that the person might render the mobile telephone inoperative in another way, thus preventing it from being remotely located.

A first object of the present invention is to provide a method according to the introductory part of claim 1, where the mobile communication unit consumes substantially less average power than would be the case if the communication unit were in a continuous standby mode, and which moreover results in the communication unit being difficult for unauthorised persons to trace.

This object is achieved by means of the features set forth in the characterising part of claim 1.

A second object of the invention is to provide a device according to the introductory part of claim 6, where the mobile communication unit has an average power consumption which is less than would be the case if the communication unit were in a continuous standby mode, and where in addition the communication unit is difficult for unauthorised persons to trace.

This object is achieved by means of the features set forth in the characterising part of claim 6.

Further objects and advantages are achieved by means of the features set forth in the dependent claims.

Figure 2:
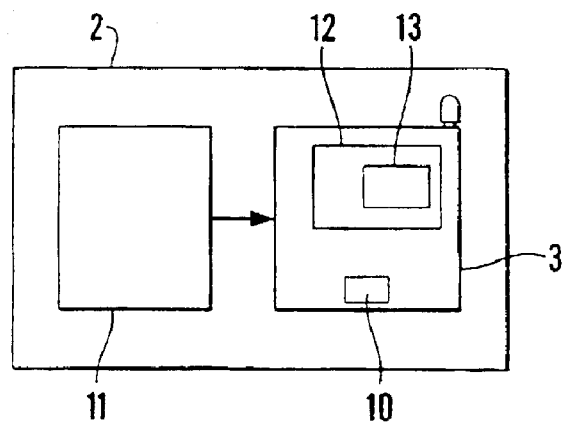
Figure 3:
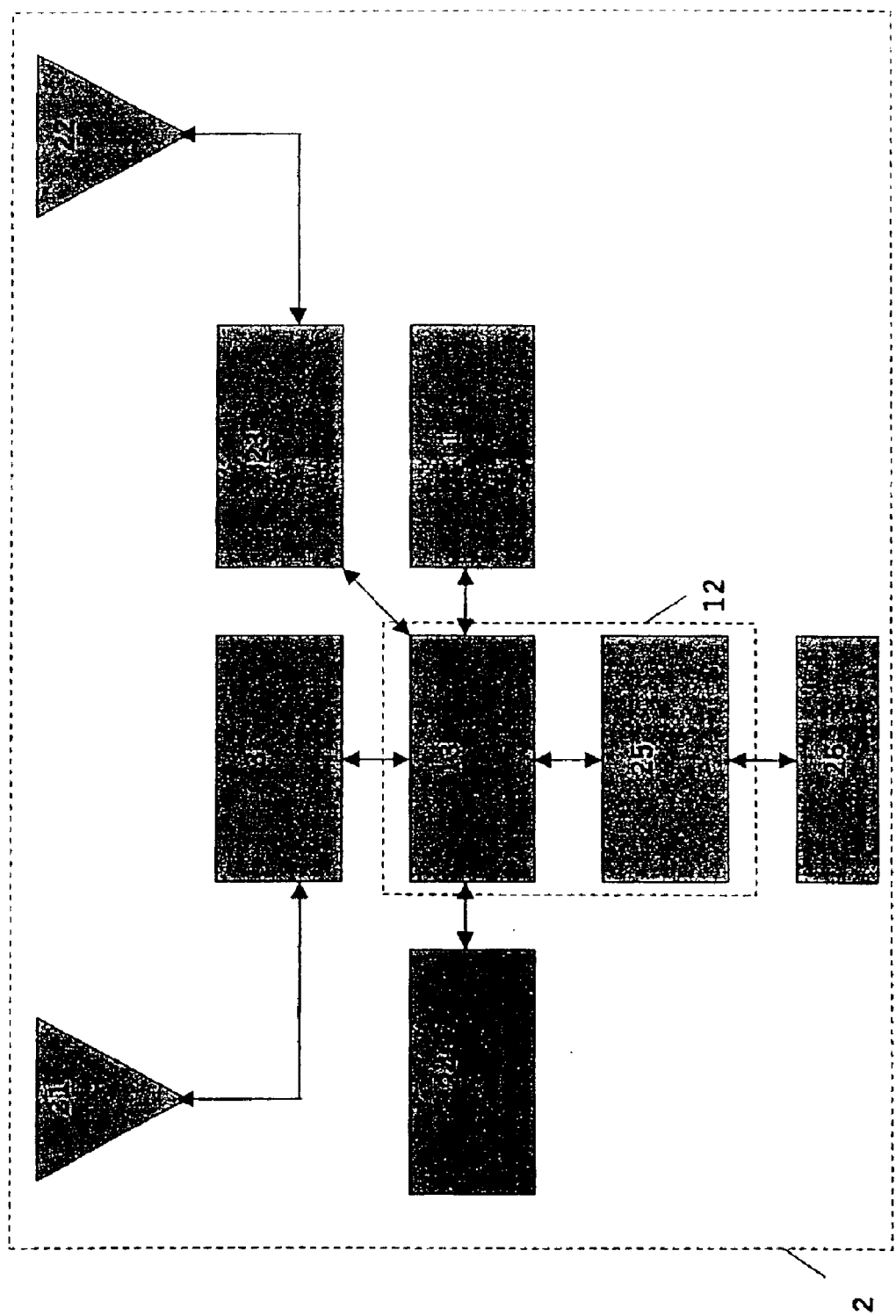

The invention will now be described in detail with reference to an embodiment illustrated in the figures, in which:

FIG. 1 is a block diagram of a system for location of an object, in which there are employed a method and a locating device according to the invention, FIG. 2 is a block diagram of a locating device according to the invention, FIG. 3 is a block diagram of an alternative locating device according to the invention, and FIG. 4 is a flow chart for a process carried out in the locating device.

The system illustrated in FIG. 1 comprises an object 1 which has to be remotely located. The object 1 is here indicated as a vehicle, in particular a private car, but it may equally well be another object wherein it is practical to place a locating device for remote location, for example a lorry, a trailer, a boat, a computer, a television set, a piece of furniture or another valuable article of a certain size. Together with the object 1 there is placed a locating device 2.

In order to ensure that the locating device 2 accompanies the object even though the object should fall into the hands of unauthorised persons, the locating device 2 is placed in a concealed manner together with the object 1.

The locating device 2 comprises a mobile communication unit 3. In principle the communication unit 3 may essentially comprise a GSM mobile telephone where superfluous components such as keyboard, display, microphone and loudspeaker/headphone are omitted.

In the same way as that known from ordinary mobile telephones, the communication unit 3 may operate in three different modes:

sleep mode, where the unit cannot communicate, but where the most basic functions are still supplied with electric power. A processor's interrupt functions in particular are available in this mode, thus enabling the unit to be "wakened" by means of hardware interrupt and thereby brought into another more power-demanding mode. In sleep mode the unit's power consumption is minimal.

standby mode, where the unit is capable of receiving radio signals from a base station. In this mode the unit consumes moderate power, since the most power-demanding components are not in use.

transmission mode, where the unit is actively used for full duplex communication with a base station in the network. In this mode most of the unit's components are activated, and the total power consumption is relatively high.

The communication unit 3 is provided with at least one signal input which makes it possible to place the communication unit in one of the three modes, particularly to alternate between sleep mode and standby mode.

When the communication unit 3 is activated in standby mode or transmission mode, it may form part of a cellular network 4, preferably a GSM network, with a given infrastructure and given services. The network's infrastructure comprises base stations 5, base station controllers 6 and a network subsystem 7.

In the cellular network 4, preferably in the network subsystem 7, services 8 are included for providing data for the position of an activated communication unit 3. This can be achieved by known per se services which are supplied by the operator of the network 4, and with varying degrees of accuracy and other performance.

Examples of the prior art relating to methods for providing such position data include the publications U.S. Pat. Nos. 5,666,662, 5,895,436 and 5,930,717.

The service 8 involves at least obtaining data concerning the position the communication unit 3 had the last time it was activated, preferably from sleep mode to standby mode. The service 8 may also involve the ability to deliver updated and stored, historical data concerning the position of the communication unit 3.

Data concerning the position of the communication unit 3 can thus be updated in the service 8 by an activation of the communication unit 3. Such activation is carried out by bringing the communication unit 3 from sleep mode to standby mode.

In the method according to the invention the communication unit 3 can be activated depending on a time-variable signal, generated in the locating device, thus reducing the communication unit's average power consumption. The time-variable signal is influenced by the locating device's movement or alteration in movement, and particularly indicates the locating device's acceleration.

In an embodiment the communication unit is activated when the said signal indicates that the acceleration exceeds a first threshold value, or when the signal indicates that the acceleration has been less than a second threshold value in a first period of time, preferably in the range 1 to 30 minutes. Such a degree of activation is advantageous for an optimum correlation between reliable activation on movement of the object, and energy saving for increased battery life.

In a corresponding embodiment the communication unit is deactivated after it has been activated after a second period of time, preferably in the range 5 to 60 seconds. This contributes to energy saving.

In a second embodiment the communication unit is activated after the mean value of the acceleration over a period of time has exceeded a first threshold value. This is particularly advantageous for a reliable activation on movement of the object.

The said threshold values and/or periods can be altered as a response to a message received by the communication unit. This permits a remote programming of activation parameters or the choice between a set of activation parameters, without having to operate the locating device directly or remove it from the object.

FIG. 2 is a block diagram for an embodiment of a locating device 2 according to the invention.

The locating device 2 comprises the mobile communication unit 3, in which is included an identity module 10. The identity module (known as SIM; Subscriber Identity Module) contains an identification of a subscriber associated with the mobile communication unit 3.

The locating device 2 further comprises sensor device 11. This is arranged to provide a signal indicating the movement or alteration in movement of the device 2. This can be achieved by the sensor device containing a known per se acceleration sensor, for example a triple, double or single-axis accelerometer. For the sensor device 11, the use is specially preferred of a piezofilm acceleration/vibration sensor.

The signal from the sensor device 11 may be analog or digital. When using a sensor such as that mentioned above, the signal is an analog signal which in one area is approximately proportional with the acceleration along an axis. In this description the term acceleration should always be understood as a positive value, i.e. the absolute value or the module of the acceleration vector.

The sensor device 11 is connected to an activation device 12, with the result that the signal provided by the sensor device 11 is transmitted to the activation device 12. The activation device 12 is arranged to activate or deactivate the communication unit. The activation involves moving the communication unit from sleep mode to standby mode, i.e.

a mode where the communication unit 3 is capable of receiving radio signals from base stations in the network, and where the service 8 in the network at least at the time of the activation can provide updated data for the communication unit's position. The deactivation is effected by returning the communication unit 3 to sleep mode, i.e. a mode where only absolutely basic and minimally power-consuming functions, including a processor's interrupt functions, are active.

The activation device 12 comprises a processor device 13 which provides a signal for activation and deactivation of the communication unit as a function of the signal from the sensor device 11 and of the time.

In the embodiment illustrated in FIG. 2 the activation device 12, which includes the processor device 13, forms a part of the communication unit 3. This means that a processor which already executes processing associated with the communication unit's other functions, can also be employed to execute a method according to the invention.

The sensor device, possibly via suitable adapter circuits, comprising for example a comparator or a Schmitt trigger, is preferably linked to the processor device 13 via an interrupt line. By means of such an interrupt line, the object is achieved that the processor device 13 may be permitted to consume a minimum of electric power during the period in which the communication unit is deactivated.

The locating device 2 according to the invention comprises an activation device 12 for activating and deactivating the communication unit 3 depending on a time-variable signal, with a resulting reduction in the communication unit's average power consumption. The locating device 12 also comprises a signal device which generates the said signal.

In a preferred embodiment the signal device comprises a sensor device which provides a signal indicating the device's movement or alteration in movement, preferably a signal indicating the device's acceleration.

The activation device further comprises a processor device, which may be arranged to activate the mobile communication unit when the said signal indicates that the acceleration exceeds a first threshold value, or when the signal indicates that the acceleration has been less than a second threshold value in a first period, preferably in the range 1 to 30 minutes.

The processor device may further be arranged to deactivate the mobile communication unit after a second period, preferably in the range 5 to 60 seconds, each time it has been activated.

The processor device, moreover, may be arranged to alter the said threshold values and/or periods as a response to a message received by the communication unit.

In particular, the locating device 2 may be arranged to operate in two states: the first state and the second state. The first state corresponds to a normal situation where the object has not been reported stolen, while the second state corresponds to a situation where the object has been reported stolen. The locating device's function for activating or deactivating the communication unit 3 on the basis of the signal from the sensor device 11, and more specifically the above-mentioned threshold values and/or periods, together with additional properties of the time-variable signal, may be different, depending on whether the locating device 2 is in the first or the second state. The said additional properties may, for example, involve regularly or irregularly repeated pulses for periodic activation/deactivation which overrule the acceleration signal from the sensor device 11.

In the locating device's first state the function for activating or deactivating the communication unit may be described by means of the following example:

Every time the signal indicates that the acceleration is less than a second threshold value, and in addition it has been less than this second threshold value during a first period, e.g. 10 minutes, the communication unit is activated, i.e. it is brought into standby mode. After a second period, for example 10 seconds, the communication unit is deactivated again, i.e. it is brought into sleep mode.

Every time the signal indicates that the acceleration exceeds a first threshold value, the communication unit is activated, i.e. it is brought into standby mode. After a second period, for example 10 seconds, the communication unit is deactivated again, i.e. it is brought into sleep mode.

In the locating device's second state the function for activating or deactivating the communication unit may be described by means of the following example:

Independently of the signal from the acceleration sensor, the communication unit will be activated periodically with a period of, e.g., 30 minutes. After a second period after the activation, for example 10 seconds, the communication unit is deactivated again, i.e. it is returned to sleep mode.

The transition between the two said first and second states for the locating device 2 takes place as follows:

The locating device's normal state is the first state.

When the object is reported stolen, the locating device 2 requires to be brought from the first state to the second state. This can be done as follows: a text message (SMS) is transmitted to the network, addressed to the identification for the communication unit 3. If the communication unit 3 is activated at this point, i.e. in standby mode, the text message will give the response that the locating device 2 should be brought into the second state. If the communication unit 3 is deactivated at the said point of time, i.e. in sleep mode, the communication unit 3 will receive the text message the next time it is brought into standby mode. As a response to the receipt of the text message, the locating device 2 is moved into the second state.

When the object is reported to have been found again, a new text message is sent to the network, addressed to the identification for the communication unit 3. In the same way as that mentioned above, the locating device 2 will be returned to the first state as a response to this text message, either directly or the next time the communication unit 3 is brought into standby mode, thereby causing the text message to be received.

By selecting suitable values for the various threshold values and periods mentioned above, an average power consumption can be achieved which is far less than what would have been the case if the communication unit 3 were in constant standby mode. At the same time it is more difficult for unauthorised persons to trace the communication unit, since the locating device will act as a radio transmitter only for short and apparently irregular periods.

The values for the threshold values and periods may advantageously be adapted to suit the application concerned, based, amongst other things, on how the object is expected to behave with regard to movement.

A number of sets of such values can be found stored in a memory linked to the processor device 13. In the above-mentioned embodiment it is stated that the locating device has two states, but it might just as well have only one state, or three or more states. A state corresponding to a given set of values for threshold values and periods can correspond to a specific coding for the SMS message which has to place the communication unit in the corresponding condition.

In an alternative embodiment which is also covered by the invention, the activation of the locating device 2 will also be able to be implemented at specific points of time, independently per se of the response from the sensor device 11. In this case the activation device 12 will also activate and deactivate the communication unit 3 depending on a time-variable signal which may be generated by a signal generator, for example a clock generator, connected to an interrupt line in the processor device 13. Thus during its operation the communication unit will operate in a cycle where it repeatedly is located in standby mode in a first, "activated" period and in sleep mode in a second, "deactivated" period. If the second period is made considerably more protracted than the first period, a substantial reduction in the average power consumption for the communication unit 3 is achieved over time, compared with what would be the case if the communication unit were in a continuous standby mode. The values for the above-mentioned periods may be linked to the locating device's states as mentioned earlier, where alternating between conditions is carried out by means of SMS text messages.

FIG. 3 illustrates an embodiment of the locating device 2, where a separate processor device 13 is employed which is not integrated in the communication unit 3. Instead, the activation device 12 is designed as a separate unit, which comprises a processor device 13, and which is arranged between the sensor device 11 and the communication unit 3.

In this embodiment the locating device 2 comprises a separate radio transmitter 23 which associated antenna 22. The radio transmitter 23 operates completely independently of the communication unit 3, and generally in another frequency band. The function of the radio transmitter is to transmit a signal which is suitable for taking a bearing on the locating device in certain situations.

FIG. 3 also illustrates a clock circuit 24 which drives the processor device 13, an antenna 21 linked to the communication unit 3, a power control module 25 and a power supply in the form of a preferably chargeable battery 26. The last two items supply all the power-demanding components in the locating device 2 with power.

FIG. 4 is a simplified flow chart for a process which is carried out in the locating device 2, and which is an embodiment of a method according to the invention.

In this embodiment it is assumed that in a memory contained in the processor device 13 there is a set of parameters which are associated with the locating device's application.

The set of parameters contains first a1 and second a2 threshold values for accelerations, and values for first t1, second t2 and third t3 periods of time.

Such a set of parameters is preferably selected from a list consisting of several possible sets of parameters. A first set of parameters may, for example, be associated with an application where the locating device has to be placed in a car, a second set may similarly be associated with placing in a boat, and a third set may be associated with placing in a TV set.

The choice of a set of parameters from the list of sets of parameters is made by programming the locating device, for example on receipt of a coded SMS message received by the communication unit 3.

A start stage where the communication unit 3 is in sleep mode is indicated by 201.

In decision stage 202 it is decided whether an acceleration has taken place of sufficient magnitude to initiate the continuing process. This is preferably carried out by the signal from the acceleration sensor 11 initiating a hardware interrupt.

When this occurs, the process continues to decision stage 203. Otherwise, the process is maintained in sleep mode, illustrated by an arrow back to 201.

In the decision stage 203 the acceleration is measured, and it is decided whether the acceleration is greater than the first acceleration threshold value a1. If this is the case, the process continues to the delay stage 204. Otherwise, the process returns to the start stage 201.

The first delay stage 204 involves a time delay corresponding to the period T1. During the delay the acceleration is measured, preferably by regular sampling, and a mean value is updated.

In the decision stage 205 it is decided whether the mean value of the measured acceleration during the period T1 is greater than the first acceleration threshold value a1. If this is the case, the process continues to a third delay stage 209. Otherwise, the process goes to a third decision stage 206.

In the decision stage 206 the acceleration is measured again, and it is decided whether the acceleration is now less than a second threshold value a2. If this is the case, the process continues to a second delay stage 207. Otherwise, the process returns to the first delay stage 204.

The second delay stage 207 involves a time delay corresponding to the period T2.

At the end of the second delay stage 207 the acceleration is measured, and it is decided whether it is still less than the second threshold value a2. If this is the case, the process continues to the third delay stage 209. Otherwise, the process returns to the first delay stage 204.

The third delay stage 209 involves a time delay corresponding to the period T3.

At the end of the third delay stage 209 the activation stage 210 is executed. In this stage the activation device 12 generates a signal placing the communication unit 3 in standby mode. This means that the communication unit 3 becomes active in the network 4, and capable of receiving any text messages. The activation device 12 receives any such messages. The process continues to the decision stage 211.

In the decision stage 211 it is decided whether any message received is coded, thus indicating that the object 1 is reported stolen. If this is the case, the process continues to the reporting stage 212. Otherwise, the process returns to rest mode in the start stage 201.

If the communication unit 3 is supplied with equipment or functions for providing data concerning its own position, the reporting stage 212 involves the communication unit 3 transmitting such data to a receiver in the network 4. The process continues to the decision stage 213.

In the decision stage 213 it is decided whether a message received in the activation stage 210 is coded, thus indicating that a direction finding transmitter 23, if any, should be activated. If this is the case, the transmitter activation stage 214 is executed. Otherwise, the process returns to the decision stage 211.

In the transmitter activation stage 214 the direction finding transmitter is started, thus permitting a higher resolution location of the locating device 2 by means of radio receivers and direction-finding techniques.

The process illustrated in FIG. 4 is implemented by means of processor instructions implemented in a memory and executed by the processor device 13. Obtaining such instructions represents an ordinary task for a person skilled in the art, based on the description provided above.

The method and the device according to the invention have their primary application in the recovery of objects which have been stolen. The invention, however, may also be used for other purposes, for example where objects require to be located for other reasons than theft, or for locating people or animals instead of objects. The invention employs existing services in a cellular network, and is therefore suitable both for present-day services and for future, further improved services.

As a power supply for the locating device and its components, use may be made of any known per se mobile, electrical energy storage unit, normally accumulators for charging, or batteries for replacement after use. When using an accumulator it is possible to extend the operating time between chargings, or to ensure continuous maintenance of the accumulator's charge by connecting one or more mobile power generators as charging devices for the accumulator. A power generator of this kind may be an electromagnetic arrangement based on the dynamics in a mass-spring system, where a magnet and a coil are set in mechanical oscillations relative to each other. The generator can thereby supply electrical power as a result of the acceleration or vibration of the device.

In the above description reference is made to communication units and systems of the GSM type. The scope and application of the invention, however, are not limited to this system. Any mobile communication system which comprises mobile communication units in a cellular network, where data concerning the communication units' position are determined and registered by means of existing infrastructure in a network can be included in the invention as its scope is determined by the following claims.

What is claimed is:

1. A method for operating a locating device for remote location of an object, where the locating device comprises a mobile communication unit and is arranged to be placed together with the object, where data concerning the communication unit's position are determined and registered by means of existing infrastructure in a cellular network of which the communication unit forms a part when it is activated, and where the communication unit can be activated to a standby mode and deactivated to a sleep mode, characterized in that the communication unit is activated and deactivated depending on a time-variable signal, generated in the locating device, thus reducing the communication unit's average power consumption, the time-variable signal is influenced by the locating device's acceleration, the communication unit is activated when the said signal indicates that the acceleration exceeds a first threshold value, or when the signal indicates that the acceleration has been less than a second threshold value in a first period, preferably in the range 1 to 30 minutes, and that the said threshold values and/or periods can be altered as a response to a message received by the communication unit.

2. A method according to claim 1, characterized in that every time it has been activated, the communication unit is deactivated after a second period, preferably in the range 5 to 60 seconds.

3. A method according to claim 1, characterized in that the communication unit is activated after the mean value of the acceleration over a period has exceeded a first threshold value.

4. A method according to claim 1, characterized in that additional properties of the time-variable signal can be altered as a response to a message received by the communication unit.

5. A locating device for remote location of an object, comprising a mobile communication unit and arranged to be placed together with the object, where data concerning the communication unit's position are determined and registered by means of existing infrastructure in a cellular network of which the communication unit forms a part when it is activated, characterized in that it comprises an activation device, comprising a processor device, for activating and deactivating the mobile communication unit depending on a time-variable signal, thus reducing the communication unit's average power consumption, a signal device which generates the said signal, comprising a sensor device for measuring the locating device's acceleration, where the processor device is arranged to activate the mobile communication unit when the said signal indicates that the acceleration exceeds a first threshold value, or when the signal indicates that the acceleration has been less than a second threshold value in a first period, preferably in the range 1 to 30 minutes, and where the processor device is arranged to alter the said threshold values and/or periods as a response to a message received by the communication unit.

6. A device according to claim 5, characterized in that the processor device is arranged to deactivate the mobile communication unit after a second period, preferably in the range 5 to 60 seconds, every time it has been activated.

7. A device according to claim 5, characterized in that the processor device is arranged to activate the communication unit after the mean value of the acceleration over a period has exceeded a first threshold value.

8. A device according to claim 5, characterized in that the processor device is arranged to alter additional properties of the time-variable signal as a response to a message received by the communication unit.

* * * * *